United States Patent [19]

Petelka

[11] Patent Number: 5,320,396
[45] Date of Patent: Jun. 14, 1994

[54] STAKE FOR FLATBED TRAILERS

[76] Inventor: Brian W. Petelka, 10 Tansley Terrace, Carlisle, Ontario, L0R 1H0, Canada

[21] Appl. No.: 47,660

[22] Filed: Apr. 19, 1993

Related U.S. Application Data

[63] Continuation-in-part of Ser. No. 843,003, Feb. 28, 1992, abandoned.

[51] Int. Cl.$^5$ .............................................. B62D 27/00
[52] U.S. Cl. .................................. 296/43; 296/104; 105/386
[58] Field of Search ................. 296/43, 104; 105/380, 105/386

[56] References Cited

U.S. PATENT DOCUMENTS

| | | |
|---|---|---|
| 1,363,059 | 12/1920 | Shanahan . |
| 2,222,335 | 11/1940 | Dietrich . |
| 3,126,224 | 3/1964 | Carter, Jr. et al. ............... 296/43 X |
| 3,174,592 | 3/1965 | Berman et al. . |
| 3,692,354 | 9/1972 | Tuerk . |
| 3,794,375 | 2/1974 | Woodward ..................... 296/43 X |
| 4,067,601 | 1/1978 | Tuerk ............................... 296/43 X |
| 4,309,054 | 1/1982 | Allen ................................ 296/43 X |

FOREIGN PATENT DOCUMENTS

944412  3/1974  Canada .

*Primary Examiner*—Joseph D. Pape
*Attorney, Agent, or Firm*—Sixbey, Friedman, Leedom & Ferguson

[57] ABSTRACT

The present invention relates to flatbed trailers for hauling cargo on highways, and more particularly to stakes to be releasably secured in pockets along the edges of a flatbed trailer for converting that trailer from one without side walls to one with side walls. The stake comprises an elongated main body of uniform transverse cross-section. The bottom end portion of the main body is formed so as to be releasably received in the pocket. A pair of oppositely disposed panel-receiving channels extend along sides of the main body for releasably receiving sides of wall panels.

8 Claims, 2 Drawing Sheets

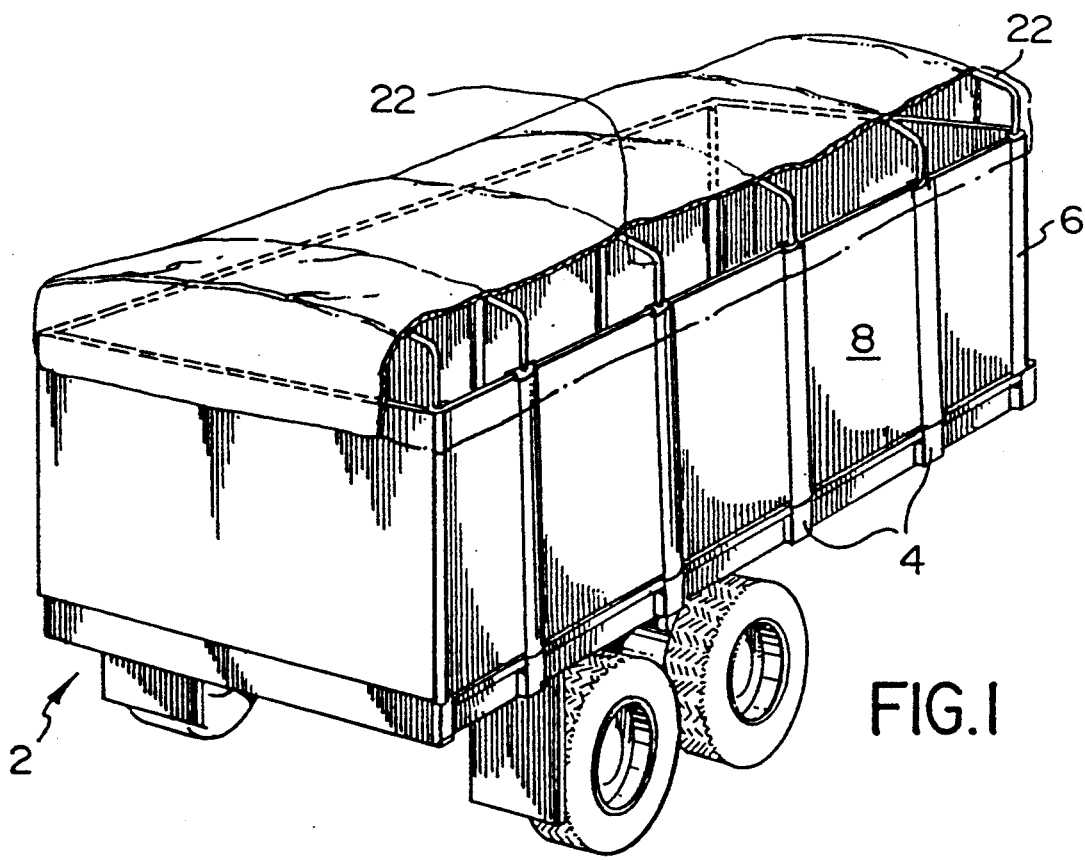
FIG. 1
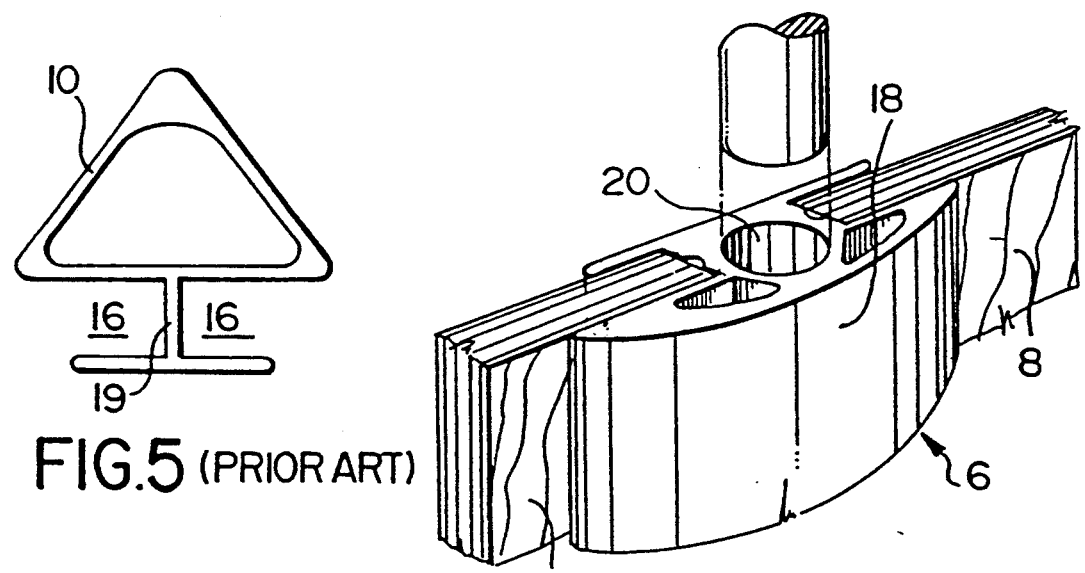
FIG. 5 (PRIOR ART)
FIG. 2
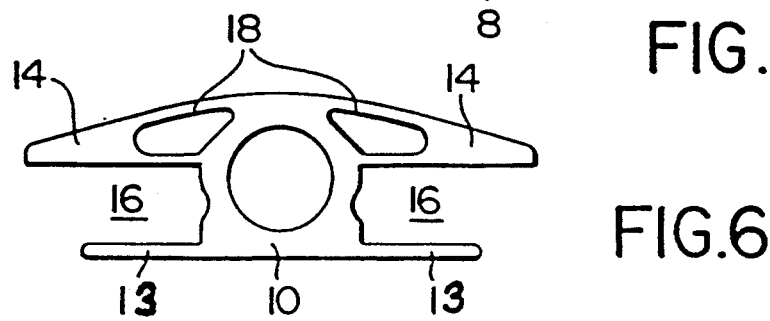
FIG. 6

STAKE FOR FLATBED TRAILERS

This is a continuation-in-part application of U.S. patent application Ser. No. 843,003 filed Feb. 28, 1992, now abandoned.

FIELD OF THE INVENTION

The present invention relates to flatbed trailers for hauling cargo on highways, and more particularly to stakes to be releasably secured in pockets along the edges of a flatbed trailer for converting that trailer from one without side walls to one with side walls.

BACKGROUND OF THE INVENTION

Previous stake arrangements for flatbed trailers have been described and illustrated in U.S. Pat. Nos. 3,126,224 of Carter et al issued Mar. 24, 1964; No. 2,222,335 of Dietrich issued Nov. 19, 1940; No. 1,363,059 of Shanahan issued Dec. 21, 1920; No. 3,174,592 of Varmon et al issued Mar. 23, 1965; No. 3,692,354 of Tuerk and No. 4,067,601 of Tuerk issued Jan. 10, 1978.

This latter patent describes a stake currently used constructed with a main body, one portion of which is flat, and a T-shaped portion which extends outwardly from that flat portion along its length to provide a pair of oppositely facing panel side-receiving channels. A problem with such prior art stake construction is that is constricts the trailer platform space available when the stakes and panels which form the vertical side walls of the trailer are in place. The channels are positioned to one side of the main body, and when the stake is in position in the pocket, they are located inwardly over portions of the platform so that valuable platform space to the exterior is lost when the panels are in position with their sides in the channels. That space may only be an inch or two, but an inch r two on both sides of the trailer may make a significant difference in the cargo handling capacity of the trailer.

SUMMARY OF THE INVENTION

In accordance with the present invention there is provided a stake to be releasably secured in a pocket along an edge of a flatbed trailer for releasably supporting a portion of a wall panel. The stake comprises an elongated main body of uniform transverse cross-section. The bottom end portion of the main body is formed so as to be releasably received in the pocket. A pair of oppositely disposed panel-receiving channels extend along opposite sides of the main body for releasably receiving sides of wall panels.

In a preferred embodiment of the present invention, the channels are each formed by a pair of spaced flanges extending outwardly in parallel fashion on opposite sides of the main body. The flanges are continuous along the stake length, including the portions which fit into the stake pocket. A corresponding one of the flanges of each pair is provided with a reinforcing means whereby outward pressure, which for example may be exerted on the panels by cargo carried on the trailer platform, is resisted.

Because the panels are secured in position on opposite sides along the main body of the stake, rather than to one side and internally thereof as in the case of prior art stakes, additional surfaces area is made available on the trailer platform within the wall panels for cargo.

Thus is an object of the present invention to provide an improved stake construction for flat bed trailers which provides an increased surface area on the platform of the trailer, when such stakes and their associated wall panels are in position, for carrying cargo.

It is a further object of the present invention to provide such a stake which is economical to construct and simple yet effective in operation.

BRIEF DESCRIPTION OF THE DRAWINGS

These and other objects and advantages of the invention will become apparent upon reading the following detailed description and upon referring to the drawings in which:

FIG. 1 is a perspective view of a flatbed trailer on which a plurality of stakes in accordance with the present invention, and associated wall panels, have been mounted;

FIG. 2 is a perspective, enlarged, partial view showing details of the upper portion of the stake construction of FIG. 1;

FIG. 5 is a top plan view of a conventional prior art stake construction; and

FIG. 6 is a top plan view of the stake construction of FIGS. 1 and 2.

Figure 3:
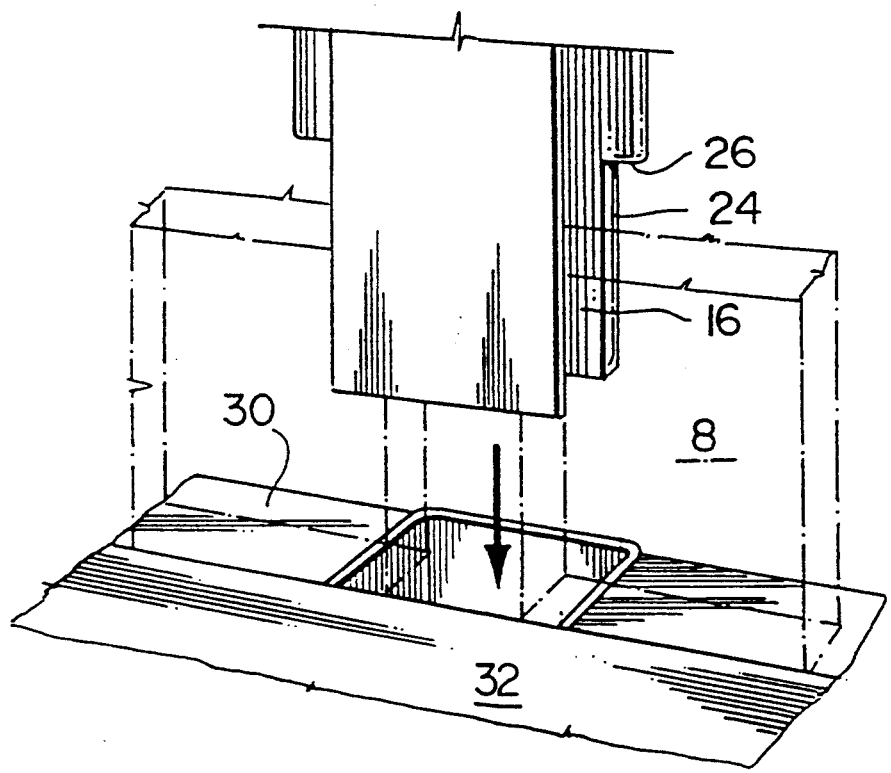
FIG. 3 is a perspective, enlarged, partial view, from the inside, of the lower portion of the stake construction of FIG. 1, illustrating the manner in which that stake fits into a pocket along the edge of the flatbed trailer.
Figure 4:
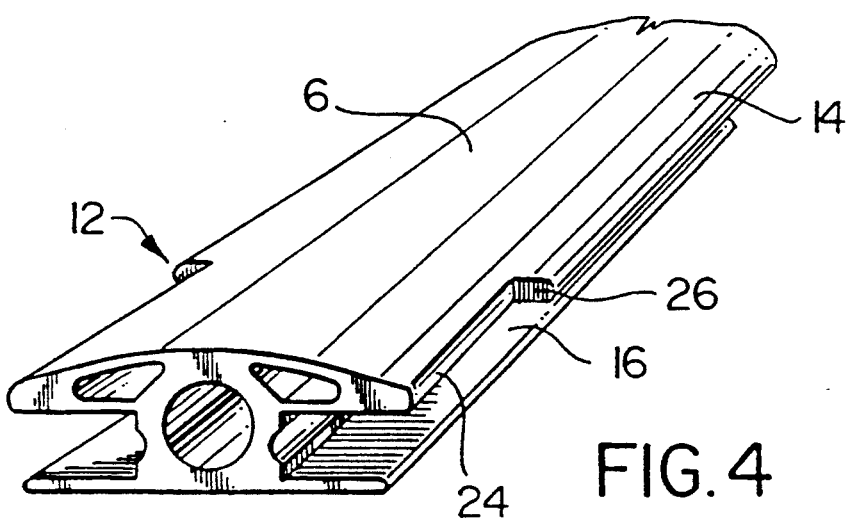
FIG. 4 is a partial perspective view of the lower portion of the stake construction of FIG. 3.

While the invention will be described in conjunction with an example embodiment, it will be understood that it is not intended to limit the invention to such embodiment. On the contrary, it is intended to cover all alternative, modifications and equivalents as may be included within the spirit and scope of the invention as defined by the appended claims.

DETAILED DESCRIPTION OF THE INVENTION

In the drawings, similar features have been given similar reference numerals.

Turning to FIG. 1 there is illustrated a flatbed trailer 2 in which are positioned, in pockets 4 along the edge of trailer 2 a plurality of stakes 6 in accordance with the present invention. Stakes 6 support, in a manner which will be described in more detail hereinafter, wall panels 8 in vertical orientation.

As can be seen in FIGS. 2, 3, 4 and 6, stake 6 comprises an elongated tubular main body portion 10 extending the length of the stake and having a uniform transverse cross-section. A bottom end portion 12 (FIG. 4) is formed, as illustrated, so as to be releasably received in pocket 4. (Depending upon the construction of pockets 4, and the fit required for stake 6 therein, the transverse cross-section of bottom end portion 12 may be the same as or vary from that of the rest of main body portion 10). Extending the length of stake 6, down to bottom end portion 12, are a pair of spaced flanges 13 and 14, extending outwardly in parallel fashion on opposite sides of main body 10, to form with it a pair of oppositely disposed channels 16 to slidably receive, as illustrated in FIG. 2, edges of panels 8. Corresponding flanges 14, which form the exterior side of stake 6 when in position on the trailer as illustrated in FIG. 1, are reinforced by means of additional bracing material 18, as illustrated, to buttress those exterior flanges 14 against forces which may be exerted on them by corresponding portions of panels 8 when cargo fills the trailer.

The top of stakes 6 is preferably provided with an aperture or pocket 20 for releasably receiving the lower ends of tarpaulin rods 22.

The bottom 12 of stake 6 has the exterior flanges 14 trimmed with notches 24, as illustrated, to fit securely into pockets 4 and provide a shoulder 26 upon which the upper section of the stake rests on the upper peripheral portions of pocket 4, to prevent the stake from passing through the pocket. In the illustrated embodiment, interior flanges 13 remain untrimmed and equal the trimmed dimension of flanges 14. (To fit smaller pockets 4, it may be required to trim both exterior flanges 14 and interior flange 13 equally).

As can be seen in FIG. 3, when a panel 8 is in position in channel 16, it rests on a support ledge 30 located between stake pockets 4 and providing, therebetween, a flat support surface for those panels. In this manner, unlike prior art stakes, the stake 6 according to the present invention does not require channels 16 to be fully removed from the bottom section 12 in order for the stake to fit in the pockets 4, thereby providing increased strength in this area. As well, stake 6 according to the present invention allows panels 8 to sit entirely outside the trailer deck 32 (FIG. 3)—excluding pockets 4.

When comparing the plan views of the stake according to the present invention (FIG. 6) with the plan view of a prior art stake (FIG. 5) can be seen that the stake construction of the present invention permits the panels, when in position, to be positioned, laterally of pockets 4, rather than inwardly thereof, as was the case with prior art stakes. In that construction, oppositely disposed panel-receiving channels 16 are provided by means of a "T" section 19 which extends along the length of a flat side of the main body section 10 of the stake. Thus it can be seen that the stake construction of the present invention provides a greater platform area for loading and carrying of cargo than does the conventional, prior art construction. As well, it should be noted that the stake construction according to the present invention fully incorporates the panel-receiving channels 16 in the geometric shape of the stake.

Thus it is apparent that there has been provided in accordance with the invention stakes for flatbed trailers that fully satisfies the objects, aims and advantages set forth above.

While the invention has been described in conjunction with a specific embodiment thereon, it is evident that many alternatives, modifications and variations will be apparent to those skilled in the art in light of the foregoing description. Accordingly, it is intended to embrace all such alternative, modifications and variations as fall within the spirit and broad scope of the invention.

What I claim as my invention:

1. A stake to be releasably secured in a pocket along an edge of a flatbed trailer for releasably supporting a portion of a wall panel, the stake comprising an elongated main body of one-piece uniform transverse cross-section including a tubular receiving portion, a bottom end portion of the main body being formed so as to be releasably received in the pocket and a pair of diametrically opposed panel-receiving channels extending along opposite sides of said tubular portion of the main body for releasably receiving sides of wall panels wherein said diametrically opposed panel-receiving channels are positioned to provide additional platform surface area on the trailer.

2. A stake according to claim 1 wherein the channels are each formed by a pair of spaced flanges extending outwardly in parallel fashion on opposite sides of the main body, the flanges extending the length of the stake.

3. A stake according to claim 2 wherein a corresponding one of the flanges of each pair is provided with reinforcing means.

4. A stake according to claim 3 wherein the reinforcing means comprises additional material secured to the main body and said corresponding one of the flanges of each pair.

5. A stake according to claim 2 wherein a top end portion is provided with an opening to receive an end of a tarpaulin bow.

6. A stake according to claim 3 wherein a top end portion is provided with an opening to receive an end of a tarpaulin bow.

7. A stake according to claim 2 wherein at least one of the flanges of each pair is trimmed to provide a reduced size of the bottom end portion of the stake to fit within the pocket, and a supporting shoulder for the rest of the stake to rest upon the pocket of the trailer.

8. A stake according to claim 1 wherein the panel-receiving channels are incorporated in the geometric shape of the stake.

* * * * *